(12) United States Patent
Crolius et al.

(10) Patent No.: US 10,386,103 B2
(45) Date of Patent: Aug. 20, 2019

(54) SUCTION CONDUIT FLOW CONTROL FOR LUBRICANT MANAGEMENT

(71) Applicant: TRANE INTERNATIONAL INC., Davidson, NC (US)

(72) Inventors: James P. Crolius, La Crosse, WI (US); Matthew Cambio, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 221 days.

(21) Appl. No.: 15/383,300

(22) Filed: Dec. 19, 2016

(65) Prior Publication Data

US 2017/0176074 A1 Jun. 22, 2017

Related U.S. Application Data

(60) Provisional application No. 62/268,775, filed on Dec. 17, 2015.

(51) Int. Cl.
| | | |
|---|---|---|
| *F25B 31/00* | (2006.01) | |
| *F25B 49/02* | (2006.01) | |
| *F25B 1/04* | (2006.01) | |
| *F25B 41/00* | (2006.01) | |
| *F25B 43/02* | (2006.01) | |

(52) U.S. Cl.
CPC ............ *F25B 49/022* (2013.01); *F25B 1/04* (2013.01); *F25B 31/004* (2013.01); *F25B 41/00* (2013.01); *F25B 43/02* (2013.01); *F25B 2400/075* (2013.01); *F25B 2500/01* (2013.01)

(58) Field of Classification Search
CPC ........ F25B 49/022; F25B 1/04; F25B 31/004; F25B 2400/075; F25B 43/02; F25B 2500/16
See application file for complete search history.

(56) References Cited

U.S. PATENT DOCUMENTS

| | | | |
|---|---|---|---|
| 4,729,228 A | 3/1988 | Johnsen | |
| 5,839,886 A * | 11/1998 | Shaw | F04B 39/0207 417/250 |
| 9,689,386 B2 * | 6/2017 | Fraser | F04C 18/02 |
| 2012/0017636 A1 * | 1/2012 | Wada | F25B 31/002 62/510 |

(Continued)

*Primary Examiner* — Frantz F Jules
*Assistant Examiner* — Lionel Nouketcha
(74) *Attorney, Agent, or Firm* — Hamre, Schumann, Mueller & Larson, P.C.

(57) ABSTRACT

A system includes first and second compressors arranged in parallel, a condenser, expansion device, evaporator, and flow control device fluidly connected. The first compressor includes a first lubricant sump and the second compressor including a second lubricant sump. A lubricant transfer conduit fluidly connects the first lubricant sump and the second lubricant sump. The flow control device is disposed between the evaporator and the first and second compressors, and includes a fluid inlet and two fluid outlets. A first of the two fluid outlets is fluidly connected to the first compressor, a second of the two fluid outlets is fluidly connected to the second compressor. The second fluid outlet includes a nozzle disposed within a flow passage of the flow control device such that a space is maintained between an outer surface of the nozzle and an inner surface of the flow passage.

15 Claims, 5 Drawing Sheets

(56) References Cited

U.S. PATENT DOCUMENTS

2013/0136622 A1* 5/2013 De Bernardi ......... F04D 29/063
  417/13
2013/0177404 A1* 7/2013 Bernardi ................ F04D 29/00
  415/168.1
2014/0037483 A1* 2/2014 Fraser .................... F04C 18/02
  418/1

* cited by examiner

SUCTION CONDUIT FLOW CONTROL FOR LUBRICANT MANAGEMENT

FIELD

This disclosure relates generally to heating, ventilation, air conditioning, and refrigeration (HVACR) systems. More specifically, the embodiments relate to lubricant management between a plurality of compressors connected in parallel.

BACKGROUND

A heat transfer circuit for a heating, ventilation, air conditioning, and refrigeration (HVACR) system generally includes a compressor, a condenser, an expansion device, and an evaporator fluidly connected. In some heat transfer circuits, a plurality of compressors can be connected in parallel. To ensure sufficient lubricant is supplied to both compressors, a lubricant level switch can be included in a lubricant sump of one or more of the compressors. When the lubricant level falls below a threshold of the lubricant level switch, operation of one or more of the plurality of compressors (e.g., speed modification if the compressor is a variable speed compressor; and/or starting/stopping the compressor if it is a fixed speed compressor) may be modified in order to bring the lubricant level back above the threshold. This can, for example, prevent the plurality of compressors from being operated with an insufficient supply of lubricant, but can impact temperature control of the heat transfer circuit due to the modification of the operation of the one or more compressors.

SUMMARY

This disclosure relates generally to heating, ventilation, air conditioning, and refrigeration (HVACR) systems. More specifically, the embodiments relate to lubricant management between a plurality of compressors connected in parallel.

The plurality of compressors includes a motor-compressor unit including a lubricant sump. In some embodiments, the lubricant sump is disposed at a relatively vertically lower portion of the compressor such that lubricant can collect in the lubricant sump via gravitational force. In some embodiments, the lubricant is entrained in a heat transfer fluid of a heat transfer circuit of the HVACR system. The lubricant is accordingly provided to the plurality of compressors via a suction conduit which provides gaseous heat transfer fluid from an evaporator of the heat transfer circuit to the plurality of compressors.

In some embodiments, the plurality of compressors can include two compressors. A first of the two compressors can be referred to as the "upstream compressor." The other of the two compressors can be referred to as the "downstream compressor." In some embodiments, the upstream compressor can be a variable speed compressor and the downstream compressor can be a fixed speed compressor.

In some embodiments, the plurality of compressors can include more than two compressors. In some embodiments, the plurality of compressors can include three compressors. In some embodiments, the plurality of compressors can include four compressors. In some embodiments, the plurality of compressors includes at least one variable speed compressor.

A flow control device can be disposed between the evaporator and the plurality of compressors. The flow control device can be designed to control a flow of heat transfer fluid and lubricant to each of the two compressors.

In some embodiments, the flow control device can separate the gaseous heat transfer fluid of the suction conduit into a lubricant rich portion and a lubricant free portion. In some embodiments, the lubricant rich portion of the gaseous heat transfer fluid can be provided to a suction input of the upstream compressor. In some embodiments, the lubricant free portion of the gaseous heat transfer fluid can be provided to a suction input of the downstream compressor.

In some embodiments, the flow control device can be designed to control a differential pressure between the upstream compressor and the downstream compressor. Controlling the differential pressure between the upstream compressor and the downstream compressor can, for example, ensure that excess lubricant flows from the lubricant sump of the upstream compressor to the lubricant sump of the downstream compressor.

A system is disclosed. The system includes first and second compressors, a condenser, an expansion device, an evaporator, and a flow control device fluidly connected. The first and second compressors are arranged in parallel. The first compressor includes a first lubricant sump and the second compressor including a second lubricant sump. A lubricant transfer conduit fluidly connects the first lubricant sump and the second lubricant sump. The flow control device is disposed between the evaporator and the first and second compressors, and includes a fluid inlet and two fluid outlets. A first of the two fluid outlets is fluidly connected to the first compressor and a second of the two fluid outlets is fluidly connected to the second compressor. The second fluid outlet having a nozzle disposed within a flow passage of the flow control device such that a space is maintained between an outer surface of the nozzle and an inner surface of the flow passage.

A method is disclosed. The method includes separating a flow of a heat transfer fluid and lubricant mixture into a lubricant rich portion and a lubricant free portion. The method further includes directing the lubricant rich portion to a suction inlet of a first compressor, the first compressor being a variable speed compressor; and directing the lubricant free portion to a suction inlet of a second compressor, the second compressor being a fixed speed compressor. The first and second compressors are arranged in parallel in a heat transfer circuit and the first compressor is upstream of the second compressor.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to heating, ventilation, air conditioning, and refrigeration (HVACR) systems. More specifically, the embodiments relate to lubricant management between a plurality of compressors connected in parallel.

A "lubricant rich portion," as used in this specification, includes a portion of a heat transfer fluid and lubricant mixture that has a relatively higher concentration of lubricant compared to another portion of the heat transfer fluid flow.

A "lubricant free portion," as used in this specification, includes a portion of a heat transfer fluid and lubricant mixture that has a relatively lower concentration of lubricant compared to another portion of the heat transfer fluid flow. It will be appreciated that the lubricant free portion may still include some lubricant.

Figure 1:
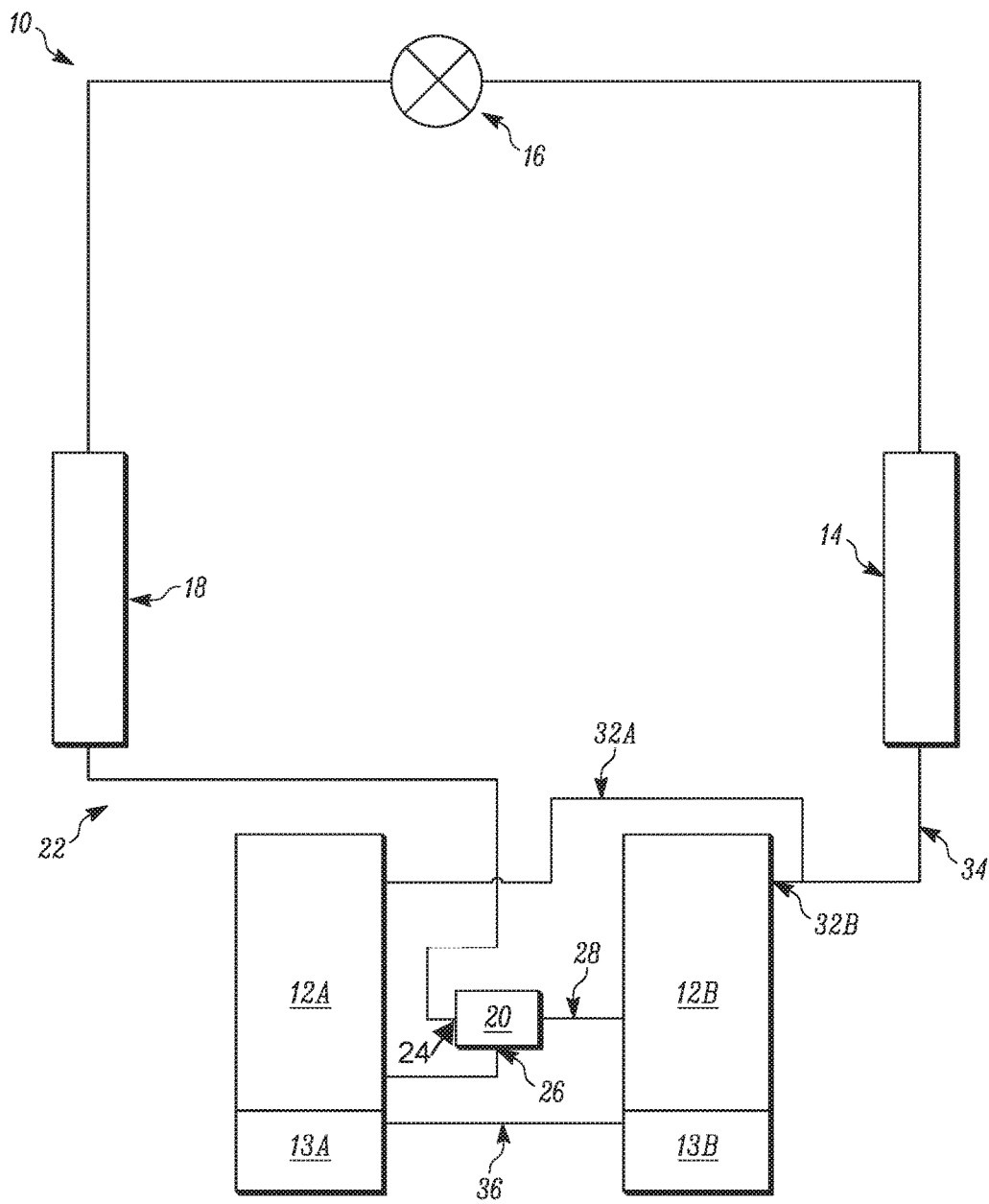
FIG. 1 is a schematic diagram of a heat transfer circuit, according to some embodiments.

FIG. 1 is a schematic diagram of a heat transfer circuit 10, according to some embodiments. The heat transfer circuit 10 generally includes a plurality of compressors 12A, 12B, a condenser 14, an expansion device 16, and an evaporator 18. The heat transfer circuit 10 is exemplary and can be modified to include additional components. For example, in some embodiments the heat transfer circuit 10 can include other components such as, but not limited to, an economizer heat exchanger, one or more flow control devices, a receiver tank, a dryer, a suction-liquid heat exchanger, or the like.

The heat transfer circuit 10 can generally be applied in a variety of systems used to control an environmental condition (e.g., temperature, humidity, air quality, or the like) in a space (generally referred to as a conditioned space). Examples of systems include, but are not limited to, heating, ventilation, air conditioning, and refrigeration (HVACR) systems, transport refrigeration systems, or the like.

The components of the heat transfer circuit 10 are fluidly connected. The heat transfer circuit 10 can be specifically configured to be a cooling system (e.g., an air conditioning system) capable of operating in a cooling mode. Alternatively, the heat transfer circuit 10 can be specifically configured to be a heat pump system which can operate in both a cooling mode and a heating/defrost mode.

Heat transfer circuit 10 can operate according to generally known principles. The heat transfer circuit 10 can be configured to heat or cool a heat transfer fluid or medium (e.g., a liquid such as, but not limited to, water or the like), in which case the heat transfer circuit 10 may be generally representative of a liquid chiller system. The heat transfer circuit 10 can alternatively be configured to heat or cool a heat transfer medium or fluid (e.g., a gas such as, but not limited to, air or the like), in which case the heat transfer circuit 10 may be generally representative of an air conditioner or heat pump.

In operation, the compressors 12A, 12B compress a heat transfer fluid (e.g., refrigerant or the like) from a relatively lower pressure gas to a relatively higher-pressure gas. The relatively higher-pressure and higher temperature gas is discharged from the compressors 12A, 12B and flows through the condenser 14. In accordance with generally known principles, the heat transfer fluid flows through the condenser 14 and rejects heat to a heat transfer fluid or medium (e.g., water, air, etc.), thereby cooling the heat transfer fluid. The cooled heat transfer fluid, which is now in a liquid form, flows to the expansion device 16. The expansion device 16 reduces the pressure of the heat transfer fluid. As a result, a portion of the heat transfer fluid is converted to a gaseous form. The heat transfer fluid, which is now in a mixed liquid and gaseous form flows to the evaporator 18. The heat transfer fluid flows through the evaporator 18 and absorbs heat from a heat transfer medium (e.g., water, air, etc.), heating the heat transfer fluid, and converting it to a gaseous form. The gaseous heat transfer fluid then returns to the compressors 12A, 12B. The above-described process continues while the heat transfer circuit 10 is operating, for example, in a cooling mode (e.g., while the compressors 12A, 12B are enabled).

The compressors 12A, 12B can be, for example, but are not limited to, scroll compressors. In some embodiments, the compressors 12A, 12B can be other types of compressors. Examples of other types of compressors include, but are not limited to, reciprocating compressors, positive displacement compressors, or other types of compressors suitable for use in the heat transfer circuit 10 and having a lubricant sump. The compressor 12A is generally representative of a variable speed compressor and the compressor 12B is generally representative of a fixed speed compressor. In some embodiments, the compressors 12A, 12B can alternatively be step control compressors (e.g., compressors having two or more steps within a compressor). In some embodiments, the compressors 12A, 12B can be compressors having different capacities. For example, compressor 12A can have a relatively greater capacity than compressor 12B, according to some embodiments. It will be appreciated that alternatively the compressor 12B can have a relatively greater capacity than compressor 12A. In some embodiments, the compressor 12A can alternatively be referred to as the "upstream compressor" and the compressor 12B can alternatively be referred to as the "downstream compressor."

The compressors 12A, 12B are connected in parallel in the heat transfer circuit 10. Accordingly, the gaseous heat transfer fluid exiting the evaporator 18 is provided via a suction conduit 22 to each of the compressors 12A, 12B. A flow control device 20 receives the gaseous heat transfer fluid at a fluid inlet 24 and provides the gaseous heat transfer fluid to the compressor 12A via a first fluid outlet 26 and to the compressor 12B via a second fluid outlet 28. The flow control device 20, according to some embodiments, is discussed in additional detail in accordance with FIG. 2 below. Following compression, the relatively higher-pressure and higher-temperature gas is discharged from compressor 12A via discharge conduit 32A and from compressor 12B via discharge conduit 32B. In some embodiments, the discharge conduits 32A, 32B of the compressors 12A, 12B are joined at discharge conduit 34 to provide the combined relatively higher-pressure and higher temperature gas to the condenser 14.

The heat transfer fluid in the heat transfer circuit 10 generally includes a lubricant entrained with the heat transfer fluid. The lubricant is provided to the compressors 12A, 12B to lubricate bearings and seal leak paths of the compressors 12A, 12B. When the relatively higher-pressure and higher-temperature heat transfer fluid is discharged from the compressors 12A, 12B, the heat transfer fluid generally carries along with it a portion of the lubricant which is initially delivered to the compressors 12A, 12B with the heat transfer fluid that enters the compressors 12A, 12B via a suction conduit 22. A portion of the lubricant is maintained in the lubricant sumps 13A, 13B of the compressors 12A, 12B.

The lubricant sumps 13A, 13B of the compressors 12A, 12B are fluidly connected via a lubricant transfer conduit 36. The lubricant transfer conduit 36 is disposed at a lubricant level of the lubricant sumps 13A, 13B which permits lubricant to flow between the compressor 12A and the compressor 12B. Fluid flow of the lubricant is controlled by a pressure differential between the lubricant sump 13A of the upstream compressor 12A and the downstream compressor 12B. As a result, if operation of the compressor 12A or 12B is modified, the fluid flow of the lubricant between the compressors 12A, 12B can be affected. The flow control device 20 is designed such that a desired pressure differential is maintained between the upstream compressor 12A and the downstream compressor 12B. In some embodiments, the desired pressure differential can be selected such that flow of lubricant in the lubricant sump 13A is induced to lubricant sump 13B at a variety of compressor 12A, 12B operating conditions. In some embodiments, the desired pressure differential can alternatively be referred to as a target pressure differential. In some embodiments, the desired pressure differential can be a minimum pressure differential at which flow of lubricant from the lubricant sump 13A will be induced to the lubricant sump 13B. In some embodiments, the desired pressure differential can be a minimum pressure differential where flow to upstream compressor 12A can be defined at a maximum compressor speed and flow to downstream compressor 12B can be defined at a minimum suction flow corresponding to a low suction temperature. The low flow to downstream compressor 12B can be when the flow control device 20 is at its minimum effectiveness. Other operating conditions where the downstream compressor 12B is running can generally yield a higher pressure differential.

In some embodiments, a diameter of the lubricant transfer conduit 36 can be relatively smaller in diameter as compared to other lubricant transfer conduits depending on the application intended. In some embodiments, the relatively smaller diameter can be selected to restrict a flow of heat transfer fluid from the lubricant sump 13A to the lubricant sump 13B. In some embodiments, a relatively smaller diameter lubricant transfer conduit 36 can, for example, prevent a pressure in the lubricant sump 13A and a pressure in the lubricant sump 13B from equalizing. In some embodiments, this can, for example, maintain a pressure differential between the lubricant sumps 13A, 13B to maintain a flow of lubricant between the lubricant sumps 13A, 13B. In some embodiments, the compressors 12A, 12B may be designed to include an outlet having a diameter designed to fit the relatively larger diameter lubricant transfer conduit. In such embodiments, an adapter (e.g., adapters 100, 200 shown and described with reference to FIGS. 3A-3E below) can be used to enable the relatively smaller diameter lubricant transfer conduit 36 to be connected to the compressors 12A, 12B.

Figure 2:
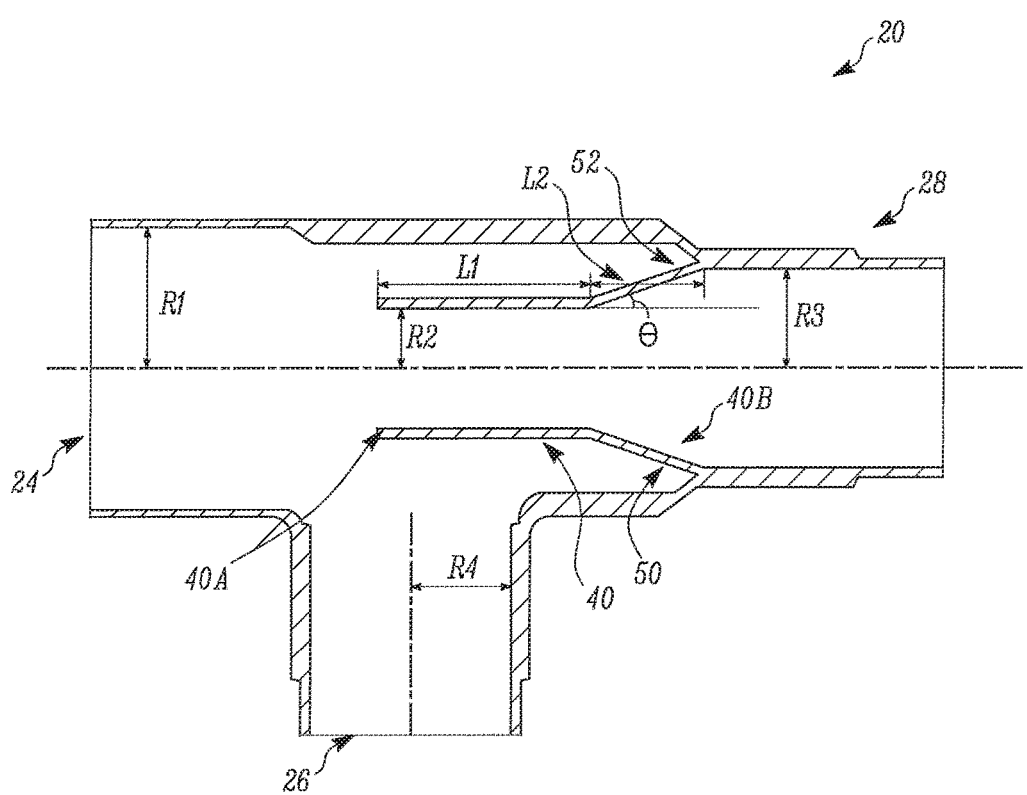
FIG. 2 is a sectional view of a flow control device for use in the heat transfer circuit of FIG. 1, according to some embodiments.

FIG. 2 is a sectional view of the flow control device 20, according to some embodiments. In operation, heat transfer fluid in suction conduit 22 (FIG. 1) is provided to the fluid inlet 24 of the flow control device 20. In some embodiments, the fluid inlet 24 can be part of the suction conduit 22.

In general, lubricant in the heat transfer fluid-lubricant mixture is more concentrated on the perimeter of the fluid inlet 24, and less concentrated toward the center of the fluid inlet 24. Lubricant in the heat transfer fluid-lubricant mixture collides with walls 50, 52, and flows toward the fluid outlet 26 which is fluidly connected to the upstream compressor 12A. The lubricant free heat transfer fluid that is disposed toward a center of the fluid inlet 24 (e.g., along a longitudinal axis of the fluid inlet 24) flows into a nozzle 40 and out fluid outlet 28 to the downstream compressor 12B.

The nozzle 40 extends from the fluid outlet 28 toward the fluid inlet 24. In some embodiments, the nozzle 40 has at least a portion with a smaller diameter than the fluid inlet 24. In some embodiments, the nozzle 40 includes at least a portion with a smaller diameter than the fluid inlet 24 such that an inlet to the nozzle 40 is disposed at or about a central region of fluid flow from the fluid inlet 24. In some embodiments, the nozzle 40 can be sized such that a space is maintained between an inner wall of the fluid inlet 24 and an outer wall of the nozzle 40. In some embodiments, the nozzle 40 extends beyond a longitudinal line extending along a longitudinal axis of the fluid outlet 26. In some embodiments, the nozzle 40 can be integrally formed with a suction conduit of the downstream compressor 12B. The nozzle 40 is sized to maintain a positive pressure in the lubricant sump 13A of the upstream compressor 12A as compared to the lubricant sump 13B of the downstream compressor 12B. The sizing includes a diameter R2 of the nozzle 40, a length L1 of extension 40A of the nozzle 40, and a length L2 of a transition 40B of the nozzle 40. In some embodiments, a value of the diameter R2 contributes to the pressure differential. As illustrated, the radius R1 of the fluid inlet 24 can be larger than a radius R3 of the fluid outlet 28. The fluid outlet 26 has a radius R4 that can also be selected to control a flow of heat transfer fluid that is lubricant rich toward the upstream compressor 12A. Controlling the location and cross-sectional area of the nozzle 40, the distributed flow from the fluid inlet 24 to the fluid outlets 26, 28 can be controlled for various compressor conditions (e.g., compressor speeds, etc.). For example, controlling an extent to which the nozzle 40 extends toward the fluid inlet 24 as compared to the fluid outlet 26. In the illustrated embodiment, the nozzle 40 and the fluid outlet 26 overlap. In some embodiments, an angle θ of expansion of the nozzle 40 can be selected to control a rate of fluid expansion of the heat transfer fluid flowing through the nozzle 40 toward the fluid outlet 28. In general, pressure drop increases as the angle θ increases.

Figure 3A:
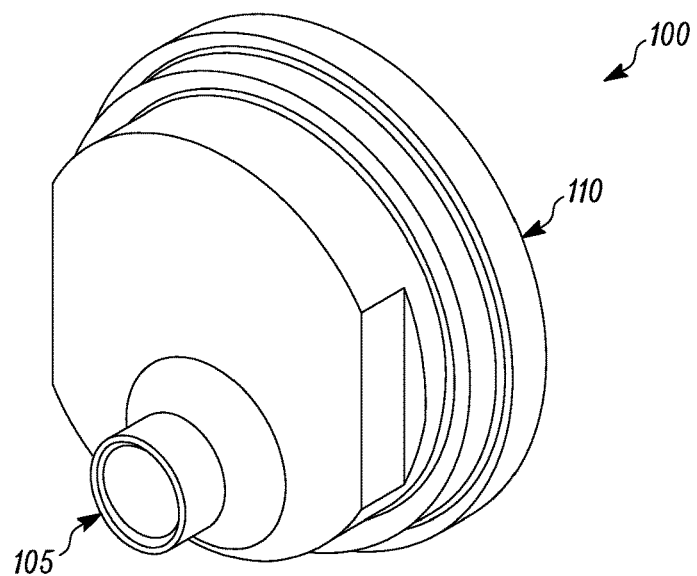
FIGS. 3A-3E illustrate various views of an adapter for a lubricant transfer conduit, according to some embodiments.
Figure 3B:
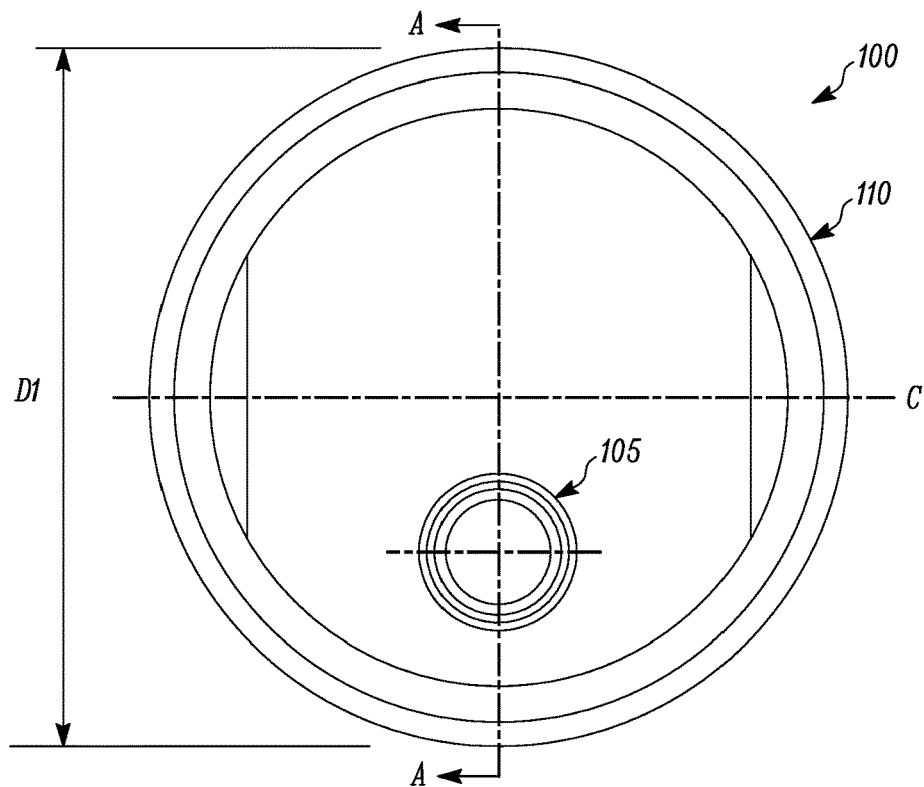
Figure 3C:
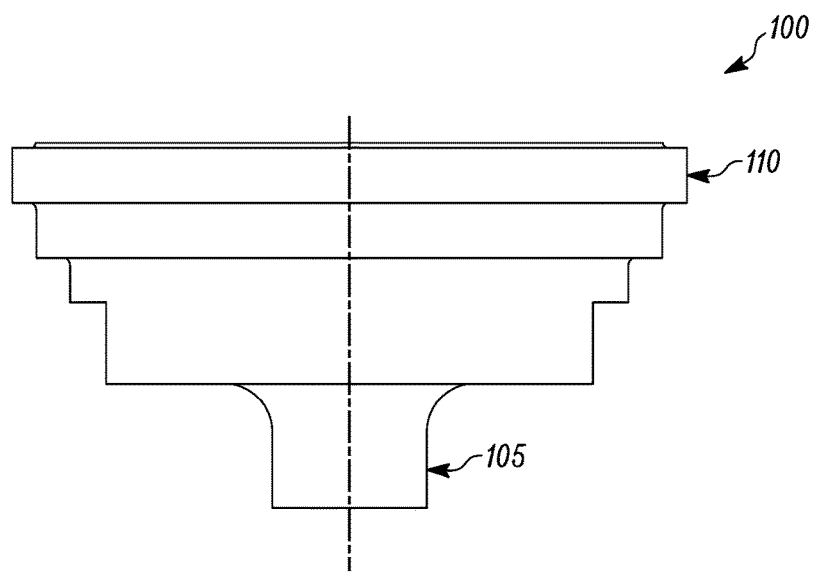
Figure 3D:
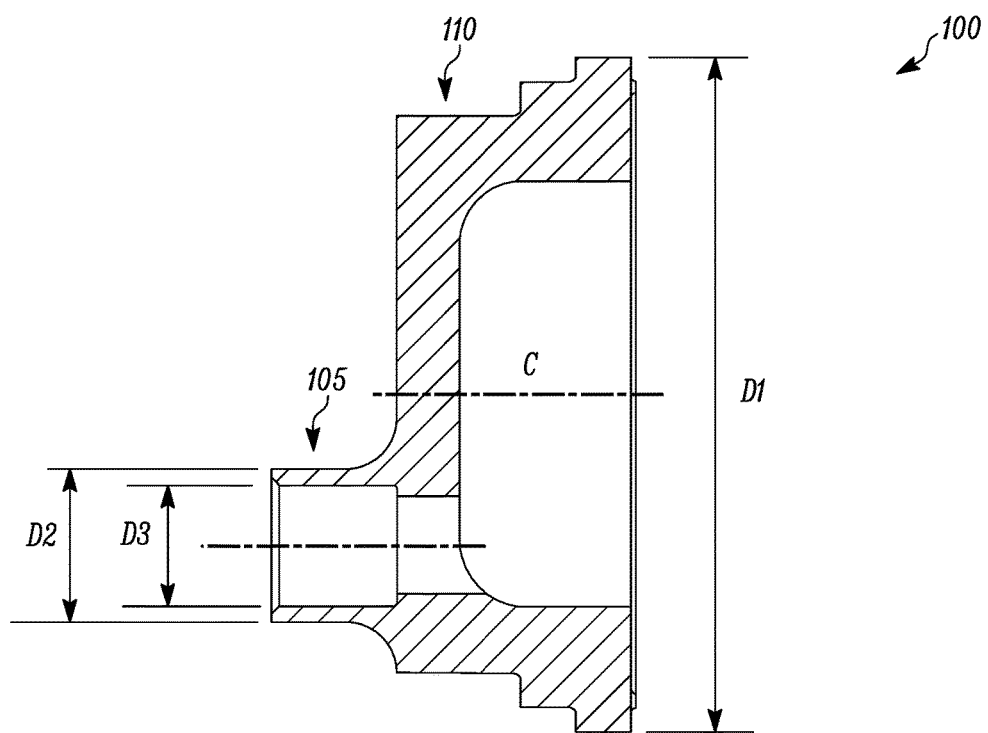
Figure 3E:
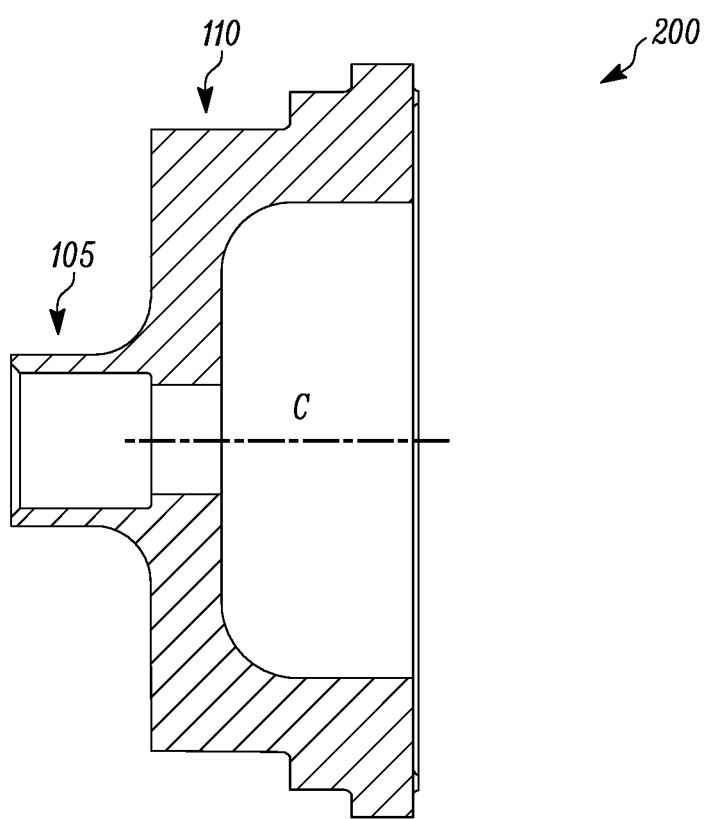

FIGS. 3A-3E illustrate various views of an adapter 100 and an adapter 200 for a lubricant transfer conduit (e.g., the lubricant transfer conduit 36 of FIG. 1), according to some embodiments. FIG. 3A illustrates an isometric view of the adapter 100, according to some embodiments. FIG. 3B illustrates a side view of the adapter 100, according to some embodiments. FIG. 3C illustrates a top view of the adapter 100, according to some embodiments. FIG. 3D illustrates a side sectional view along the line A-A of the adapter 100, according to some embodiments. FIG. 3E illustrates a side sectional view along the line A-A of the adapter 100, labeled as 200 because of a modification to a location of a portion of the adapter. For simplicity of this specification, reference will be made generally to the features of FIGS. 3A-3E without specific reference to a particular figure unless specifically stated otherwise.

The adapter 100 includes a compressor-mating portion 110 and a lubricant transfer conduit-mating portion 105. The lubricant transfer conduit-mating portion 105 has a diameter D2 which is selected based on a diameter of the lubricant transfer conduit 36. The compressor-mating portion 110 has a diameter D1 which is selected based on a diameter of an outlet from a compressor (e.g., the compressors 12A, 12B). In some embodiments, the diameter D2 can be selected such that the lubricant transfer conduit 36 can be disposed around the lubricant transfer conduit-mating portion 105. The lubricant transfer conduit-mating portion 105 can have an inner diameter D3 which is smaller than the diameter D2.

In the illustrated embodiment, the lubricant transfer conduit-mating portion 105 is disposed relatively lower (e.g., as viewed in FIG. 3B) than a centerline C of the adapter 100. In some embodiments (e.g., FIG. 3E), the lubricant transfer conduit-mating portion 105 can be disposed at or about the centerline C. In some embodiments, the lubricant transfer conduit-mating portion 105 can be disposed relatively higher than the centerline C of the adapter 100. In some embodiments, the vertical location of the lubricant transfer conduit-mating portion 105 can be designed based on maintaining a lubricant level of the lubricant sumps 13A, 13B (FIG. 1) which permits lubricant to flow between the compressors 12A, 12B (FIG. 1). It will be appreciated that in some embodiments, the compressors 12A, 12B may have a relatively smaller diameter outlet and in such embodiments, the adapter 100 may not be used.

Aspects

It is noted that any one of aspects 1-7 below can be combined with any one of aspects 8-9 and/or 10-14. Any one of aspects 8-9 can be combined with any one of aspects 10-14.

Aspect 1. A system, comprising:
first and second compressors, a condenser, an expansion device, an evaporator, and a flow control device fluidly connected;
the first and second compressors being arranged in parallel;
the first compressor including a first lubricant sump and the second compressor including a second lubricant sump;
a lubricant transfer conduit fluidly connected to the first lubricant sump and the second lubricant sump; and
the flow control device being disposed between the evaporator and the first and second compressors, the flow control device including a fluid inlet and two fluid outlets, a first of the two fluid outlets being fluidly connected to the first compressor and a second of the two fluid outlets being fluidly connected to the second compressor, the second fluid outlet having a nozzle disposed within a flow passage of the flow control device such that a space is maintained between an outer surface of the nozzle and an inner surface of the flow passage.

Aspect 2. The system according to aspect 1, wherein the first compressor is a variable speed compressor and the second compressor is a fixed speed compressor.

Aspect 3. The system according to any one of aspects 1-2, wherein the first and second compressors are scroll compressors.

Aspect 4. The system according to any one of aspects 1-3, wherein the nozzle extends from the second of the two fluid outlets toward the fluid inlet.

Aspect 5. The system according to aspect 4, wherein a longitudinal axis of the second of the two fluid outlets is co-linear with a longitudinal axis of the fluid inlet.

Aspect 6. The system according to any one of aspects 4-5, wherein a longitudinal axis of the first of the two fluid outlets is perpendicular to the fluid inlet.

Aspect 7. The system according to any one of aspects 4-6, wherein a radius of the fluid inlet is greater than a radius of the second of the two fluid outlets.

Aspect 8. A method, comprising:
separating a flow of a heat transfer fluid and lubricant mixture into a lubricant rich portion and a lubricant free portion;
directing the lubricant rich portion to a suction inlet of a first compressor, the first compressor being a variable speed compressor; and
directing the lubricant free portion to a suction inlet of a second compressor, the second compressor being a fixed speed compressor,
wherein the first and second compressors are arranged in parallel in a heat transfer circuit and the first compressor is upstream of the second compressor.

Aspect 9. The method according to aspect 9, wherein the separating the flow is completed using a flow control device including a fluid inlet and two fluid outlets, a first of the two fluid outlets being fluidly connected to the first compressor and a second of the two fluid outlets being fluidly connected to the second compressor, the second fluid outlet having a nozzle disposed within a flow passage of the flow control device such that a space is maintained between an outer surface of the nozzle and an inner surface of the flow passage.

Aspect 10. A flow control device for a heating, ventilation, air conditioning, and refrigeration system, comprising:
a fluid inlet and two fluid outlets, a first of the two fluid outlets being fluidly connectable to a first compressor and a second of the two fluid outlets being fluidly connectable to a second compressor, the second fluid outlet having a nozzle disposed within a flow passage of the flow control device such that a space is maintained between an outer surface of the nozzle and an inner surface of the flow passage.

Aspect 11. The flow control device according to aspect 10, wherein the nozzle extends from the second of the two fluid outlets toward the fluid inlet.

Aspect 12. The flow control device according to aspect 11, wherein a longitudinal axis of the second of the two fluid outlets is co-linear with a longitudinal axis of the fluid inlet.

Aspect 13. The flow control device according to aspect 11, wherein a longitudinal axis of the first of the two fluid outlets is perpendicular to the fluid inlet.

Aspect 14. The flow control device according to aspect 11, wherein a radius of the fluid inlet is greater than a radius of the second of the two fluid outlets.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:
1. A system, comprising:
first and second compressors, a condenser, an evaporator, and a flow control device fluidly connected;
the first and second compressors being arranged in parallel;
the first compressor being a variable speed compressor and including a first lubricant sump, and the second compressor being a fixed speed compressor and including a second lubricant sump;
a lubricant transfer conduit fluidly connected to the first lubricant sump and the second lubricant sump; and
the flow control device being disposed between the evaporator and the first and second compressors, the flow control device including
a fluid inlet and two fluid outlets, a first of the two fluid outlets being fluidly connected to the first compressor and a second of the two fluid outlets being fluidly connected to the second compressor,
the second of the two fluid outlets having a nozzle disposed within a flow passage of the flow control device such that a space is maintained between an outer surface of the nozzle and an inner surface of the flow passage, the nozzle extending at an angle relative to the second of the two fluid outlets, a radius of the second of the two fluid outlets being greater than a radius of the nozzle,
wherein the nozzle extends from the second of the two fluid outlets toward the fluid inlet, the nozzle including a nozzle inlet, the nozzle inlet being disposed at a first distance from the fluid inlet along a longitudinal axis of the fluid inlet,
the first of the two fluid outlets including an edge that is relatively closest to the fluid inlet along the longitudinal axis of the fluid inlet, the edge being disposed at a second distance from the fluid inlet along the longitudinal axis of the fluid inlet, and
the first distance being greater than the second distance.

2. The system according to claim 1, wherein the first and second compressors are scroll compressors.

3. The system according to claim 1, wherein a longitudinal axis of the second of the two fluid outlets is co-linear with a longitudinal axis of the fluid inlet.

4. The system according to claim 1, wherein a longitudinal axis of the first of the two fluid outlets is perpendicular to the fluid inlet.

5. The system according to claim 1, wherein the nozzle extends from the second of the two fluid outlets and is tapered relative to the second of the two fluid outlets.

6. The system according to claim 1, wherein the fluid inlet, the nozzle, and the second of the two fluid outlets are concentrically arranged.

7. The system according to claim 1, the first of the two fluid outlets including an edge, wherein a radius of the fluid inlet is constant from the fluid inlet to the edge.

8. The system according to claim 1, wherein a radius of the fluid inlet is relatively larger than the radius of the nozzle, and the radius of the fluid inlet is relatively larger than the radius of the second of the two fluid outlets.

9. A method, comprising:
separating a flow of a heat transfer fluid and lubricant mixture into a lubricant rich portion and a lubricant free portion having a relatively lower concentration of lubricant compared to the lubricant rich portion using a flow control device including a fluid inlet and two fluid outlets, a first of the two fluid outlets being fluidly connected to a first compressor and a second of the two fluid outlets being fluidly connected to a second compressor, the second of the two fluid outlets having a nozzle disposed within a flow passage of the flow control device such that a space is maintained between an outer surface of the nozzle and an inner surface of the flow passage, the nozzle extending at an angle relative to the second of the two fluid outlets, a radius of the second of the two fluid outlets being greater than a radius of the nozzle, the nozzle including a nozzle inlet, the nozzle inlet being disposed at a first distance from the fluid inlet along a longitudinal axis of the fluid inlet, the first of the two fluid outlets including an edge that is relatively closest to the fluid inlet along the longitudinal axis of the fluid inlet, the edge being disposed at a second distance from the fluid inlet along the longitudinal axis of the fluid inlet, and the first distance being greater than the second distance;
directing the lubricant rich portion to a suction inlet of the first compressor, the first compressor being a variable speed compressor; and
directing the lubricant free portion to a suction inlet of the second compressor, the second compressor being a fixed speed compressor,
wherein the first and second compressors are arranged in parallel in a heat transfer circuit and the first compressor is upstream of the second compressor.

10. A flow control device for a heating, ventilation, air conditioning, and refrigeration system, comprising:
a fluid inlet and two fluid outlets,
a first of the two fluid outlets being fluidly connectable to a first compressor and a second of the two fluid outlets being fluidly connectable to a second compressor,
the second of the two fluid outlets having a nozzle disposed within a flow passage of the flow control device such that a space is maintained between an outer surface of the nozzle and an inner surface of the flow passage, the nozzle extending at an angle relative to the second of the two fluid outlets, a radius of the second of the two fluid outlets being greater than a radius of the nozzle,
the nozzle including a nozzle inlet, the nozzle inlet being disposed at a first distance from the fluid inlet along a longitudinal axis of the fluid inlet,
the first of the two fluid outlets including an edge that is relatively closest to the fluid inlet along the longitudinal axis of the fluid inlet, the edge being disposed at a second distance from the fluid inlet along the longitudinal axis of the fluid inlet, and
the first distance being greater than the second distance.

11. The flow control device according to claim 10, wherein a longitudinal axis of the second of the two fluid outlets is co-linear with the longitudinal axis of the fluid inlet.

12. The flow control device according to claim 10, wherein a longitudinal axis of the first of the two fluid outlets is perpendicular to the fluid inlet.

13. The flow control device according to claim 10, wherein a radius of the fluid inlet is greater than a radius of the second of the two fluid outlets.

14. The flow control device according to claim 10, wherein the nozzle extends from the second of the two fluid outlets and is tapered relative to the second of the two fluid outlets.

15. A system, comprising:
first and second compressors, a condenser, an evaporator, and a flow control device fluidly connected;
the first and second compressors being arranged in parallel;
the first compressor being a variable speed compressor and including a first lubricant sump, and the second compressor being a fixed speed compressor and including a second lubricant sump;
a lubricant transfer conduit fluidly connected to the first lubricant sump and the second lubricant sump; and
the flow control device being disposed between the evaporator and the first and second compressors, the flow control device including
a fluid inlet and two fluid outlets,
a first of the two fluid outlets being fluidly connected to the first compressor and a second of the two fluid outlets being fluidly connected to the second compressor, the second of the two fluid outlets having a nozzle disposed within a flow passage of the flow control device such that a space is maintained between an outer surface of the nozzle and an inner surface of the flow passage, the nozzle extending at an angle relative to the second of the two fluid outlets, a radius of the second of the two fluid outlets being greater than a radius of the nozzle, wherein the nozzle extends from the second of the two fluid outlets toward the fluid inlet, and wherein a longitudinal axis of the second of the two fluid outlets is co-linear with a longitudinal axis of the fluid inlet.

* * * * *